(12) United States Patent
Engstrom et al.

(10) Patent No.: US 9,961,906 B2
(45) Date of Patent: May 8, 2018

(54) HOT AIR RACK OVEN

(71) Applicant: REVENT INTERNATIONAL AB, Upplands Vasby (SE)

(72) Inventors: Olof Engstrom, Huddinge (SE); Magnus Krabbe, Stenhamra (SE); Per Junesand, Stockholm (SE)

(73) Assignee: Revent International AB (SE)

( * ) Notice: Subject to any disclaimer, the term of this patent is extended or adjusted under 35 U.S.C. 154(b) by 203 days.

(21) Appl. No.: 14/427,123

(22) PCT Filed: Sep. 11, 2013

(86) PCT No.: PCT/SE2013/051055
§ 371 (c)(1),
(2) Date: Mar. 10, 2015

(87) PCT Pub. No.: WO2014/042579
PCT Pub. Date: Mar. 20, 2014

(65) Prior Publication Data
US 2015/0245622 A1 Sep. 3, 2015

(30) Foreign Application Priority Data
Sep. 12, 2012 (SE) ...................................... 1251022

(51) Int. Cl.
*A21B 1/26* (2006.01)
*A21B 1/44* (2006.01)
*A21B 3/02* (2006.01)

(52) U.S. Cl.
CPC ................. *A21B 1/26* (2013.01); *A21B 1/44* (2013.01); *A21B 3/02* (2013.01)

(58) Field of Classification Search
CPC ................ A21B 1/26; A21B 3/02; A21B 1/44
See application file for complete search history.

(56) References Cited

U.S. PATENT DOCUMENTS

| 1,485,173 A | | 2/1924 | Eaton et al. | |
|---|---|---|---|---|
| 1,535,579 A | * | 4/1925 | Colby | A47J 37/043 219/391 |
| 1,543,692 A | * | 6/1925 | Biebel | A21B 1/44 219/395 |

(Continued)

FOREIGN PATENT DOCUMENTS

| EP | 0 848 213 A1 | 6/1998 |
|---|---|---|
| EP | 2 384 626 A1 | 11/2011 |

(Continued)

OTHER PUBLICATIONS

International Search Report, dated Jan. 2, 2014, from corresponding PCT application.

(Continued)

*Primary Examiner* — Sean Michalski
(74) *Attorney, Agent, or Firm* — Swanson & Bratschun, L.L.C.

(57) ABSTRACT

Rack oven for baking good on a rack inside an oven chamber, wherein the oven chamber wall has one or more curved portions which are curved around a substantially vertical axis and the total angle subtended by the one or more curved portions is more than 80° and less than 300° of the perimeter of the chamber.

19 Claims, 3 Drawing Sheets

(56) References Cited

U.S. PATENT DOCUMENTS

| | | | | |
|---|---|---|---|---|
| 1,786,142 A * | 12/1930 | Wyman | A21B 1/44 | 432/142 |
| 2,431,753 A | 12/1947 | Holderle et al. | | |
| 3,425,364 A * | 2/1969 | Martin, Jr. | A21B 1/26 | 432/142 |
| 3,537,405 A * | 11/1970 | Verhoeven | A21B 1/24 | 219/400 |
| 3,641,945 A * | 2/1972 | Tillander | A21B 1/44 | 165/121 |
| 3,827,182 A * | 8/1974 | Van Helleputte | B63B 19/08 | 49/40 |
| 3,954,053 A * | 5/1976 | Johansson | A21B 1/44 | 99/443 R |
| 4,503,837 A * | 3/1985 | Smith | A21B 3/02 | 126/190 |
| 4,552,123 A | 11/1985 | Birkner et al. | | |
| 4,643,163 A * | 2/1987 | Martinez | A21B 1/28 | 126/41 A |
| 4,785,151 A * | 11/1988 | Voegtlin | A21B 1/24 | 126/21 A |
| 4,892,083 A * | 1/1990 | Konig | A21B 1/26 | 126/20 |
| 5,107,821 A * | 4/1992 | von Blanquet | F24C 15/04 | 126/19 R |
| 5,129,384 A * | 7/1992 | Parks | A21B 1/44 | 126/21 A |
| 5,185,925 A | 2/1993 | Ryan et al. | | |
| 5,394,791 A * | 3/1995 | Vallee | A21B 1/44 | 126/21 A |
| 5,398,666 A * | 3/1995 | Smith | A21B 1/44 | 126/21 A |
| 5,431,093 A * | 7/1995 | Dodgen | A47J 37/042 | 126/25 R |
| 5,845,563 A * | 12/1998 | Haring | A47J 37/043 | 99/419 |
| 6,167,800 B1 * | 1/2001 | Su | A47J 37/0623 | 99/419 |
| 6,363,836 B1 * | 4/2002 | Usherovich | A47J 37/043 | 99/339 |
| 6,998,582 B1 * | 2/2006 | Maroti | F24C 15/102 | 219/451.1 |
| 9,574,778 B2 * | 2/2017 | Woods | F24C 15/026 | |
| 2002/0108502 A1 * | 8/2002 | Kim | A47J 37/0709 | 99/419 |
| 2004/0144260 A1 * | 7/2004 | Backus | A47J 37/041 | 99/419 |
| 2006/0225580 A1 * | 10/2006 | Fernandez | A47J 37/041 | 99/419 |
| 2006/0289530 A1 * | 12/2006 | Cordae | F24C 15/026 | 219/756 |
| 2008/0156201 A1 * | 7/2008 | Cook | A21B 1/44 | 99/443 R |
| 2009/0145031 A1 * | 6/2009 | Collene | E05F 1/1066 | 49/113 |
| 2009/0294441 A1 | 12/2009 | Wen et al. | | |
| 2013/0239944 A1 * | 9/2013 | Woods | F24C 15/026 | 126/190 |
| 2014/0224133 A1 * | 8/2014 | Willett | A47J 37/043 | 99/443 R |
| 2015/0245622 A1 * | 9/2015 | Engstrom | A21B 1/44 | 99/443 R |
| 2016/0245532 A1 * | 8/2016 | Eliasson | A21B 1/44 | |

FOREIGN PATENT DOCUMENTS

| | | |
|---|---|---|
| FR | 2 699 219 A1 | 6/1994 |
| GB | 855 029 A | 11/1960 |
| JP | S56-58006 U | 5/1981 |
| JP | S62-186733 A | 8/1987 |

OTHER PUBLICATIONS

Japanese Office Action issued in Application No. 2015-531044, dated May 9, 2017.

* cited by examiner

SECTION III

SECTION IV

HOT AIR RACK OVEN

FIELD OF THE INVENTION

The invention relates to a hot air rack oven with an oven chamber and means for rotating a rack introduced into the oven chamber.

BACKGROUND OF THE INVENTION

Hot air baker's rack ovens are known in which the goods which are to be baked are introduced on baking sheets arranged on square or rectangular trays or pans held in a quadratic wheeled rack. The rack is intended to be introduced into the oven chamber of the oven and to remain there while the baking process takes place. The oven chamber has a rectangular or square horizontal cross-section (i.e. the cross-section when viewed from above is rectangular or square) and is dimensioned to accept a rack and allow it to be rotated. Hot air can be introduced via one or two corner vents into the oven chamber to bake the goods. This leads to a temperature gradient across the oven chamber which can lead to uneven cooking of the goods. In order to reduce uneven baking of the goods, the rack is rotated around a vertical axis during the baking process. This can be achieved by placing the rack on a turntable during the baking process or by lifting the rack with a rotatable hook which is rotated during the baking process. Once the baking process is finished the rack is removed (after being lowered and decoupled from the hook if such a hook is used) from the open rack oven. An example of such a rack oven is known from U.S. Pat. No. 3,954,053. This has a substantially rectangular oven chamber with a straight back wall, two parallel, spaced-apart side walls arranged perpendicular to the back wall and a curved door able to close off the front end of the oven chamber.

Despite the use of rotating racks it is still not always possible to get an even temperature throughout the oven and uneven cooking of the goods often results.

BRIEF DESCRIPTION OF THE INVENTION

The invention has for its object to provide a rack oven of the type described above, which eliminates the disadvantages of the prior art ovens.

This is achieved by a rack oven having the features of the characterizing part of the main claim. Advantageous embodiments are described in the dependent claims.

Thus, the present invention relates to a hot air rack oven, for the baking of goods on a rack, comprising an oven chamber, a door opening, a door and rack rotating mechanism for rotating a rack which rotates about a vertical axis. The oven chamber wall has one or more curved portions, each of which is a segment of a circle of diameter D with respect to a substantially vertical axis and wherein said one or more curved portions subtend over an angle with respect to the substantially vertical axis and that the total angle subtended by said one or more curved portions is more than 80° and less than 300° of the perimeter of the chamber. Furthermore, the door is curved with essentially the same diameter D as the oven chamber, and is able to slide laterally to one side of the opening.

The oven chamber, including the curved door, has an essentially circular cross-section which is advantageous in order to control the hot air flow, i.e. the air flow is unobstructed. This results in an even heat transfer from the top to bottom of the rack and from the outer edge to the centre of the baking tray.

This is also advantageous with regard to the energy efficiency of the oven as the oven chamber volume is smaller in comparison to a corresponding conventional rack oven. Also, the floor space, the footprint, of the oven is reduced when comparing to a conventional rack oven having a rectangular cross-section for the same size of rack, which in turn has implications on the oven production process that requires less material.

By providing a curved sliding door, in combination with the circular cross-section, result in that the access to the oven chamber is made easier when placing the rack in the oven, or when removing the rack. This is due to the fact that the rack is positioned closer to the opening because of the circular cross-sectional shape of the oven chamber.

In addition there is less risk for the operator to get burned when opening a curved sliding door in comparison to open a conventional hinged door.

DETAILED DESCRIPTION OF THE INVENTION

Figure 1:
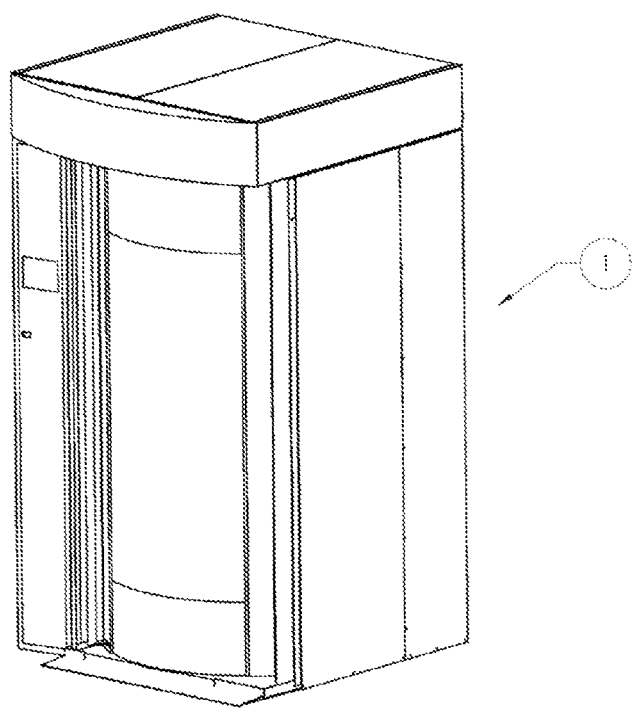
FIG. 1 shows schematically a perspective view of a rack oven in accordance with a first embodiment of the present invention.
Figure 2:
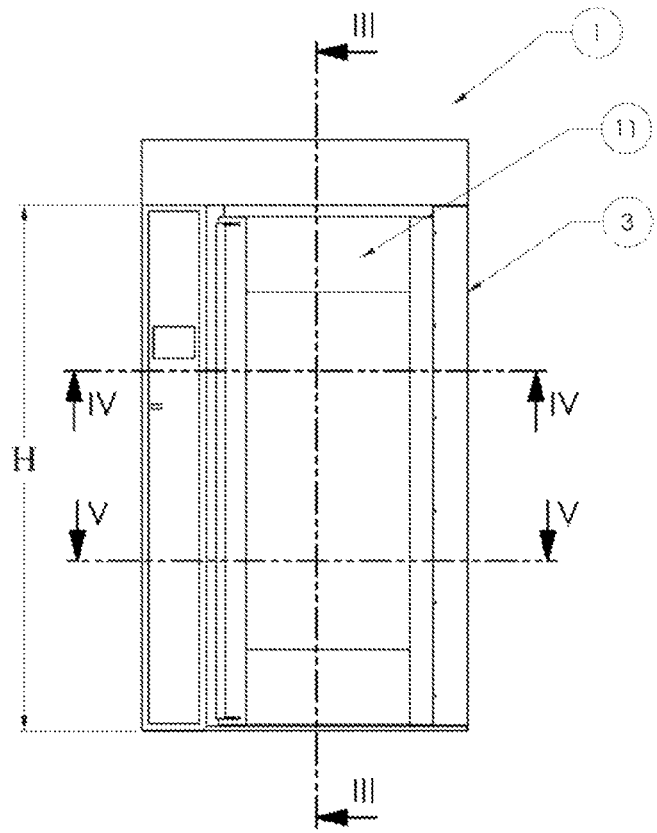
FIG. 2 shows schematically a view from the front of the rack oven of FIG. 1.
Figure 3:
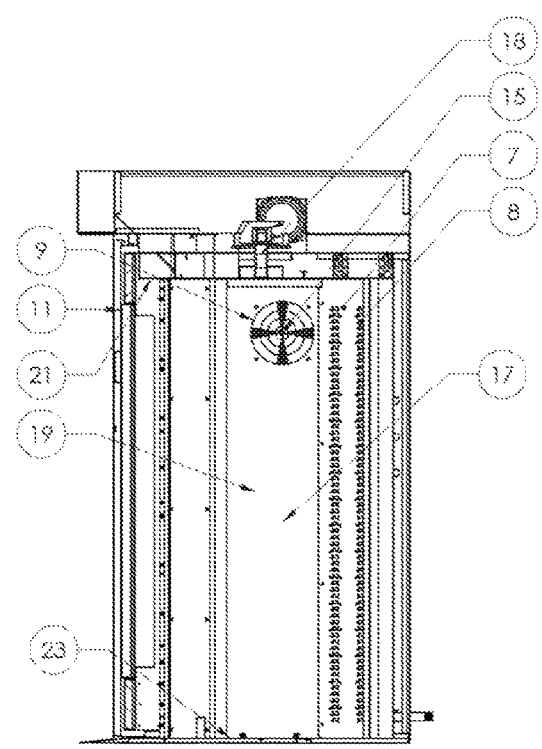
FIG. 3 shows schematically a cross-section through line of the rack oven shown in FIGS. 1 and 2.
Figure 4:
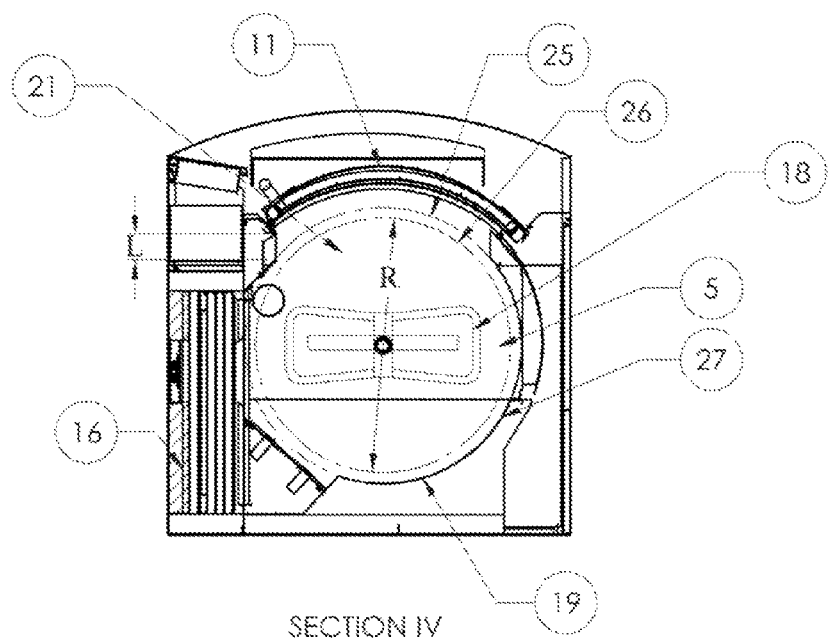
FIG. 4 shows a schematically cross-section through line IV-IV of the embodiment of a rack oven according to the present invention shown in FIGS. 1 and 2.
Figure 5:
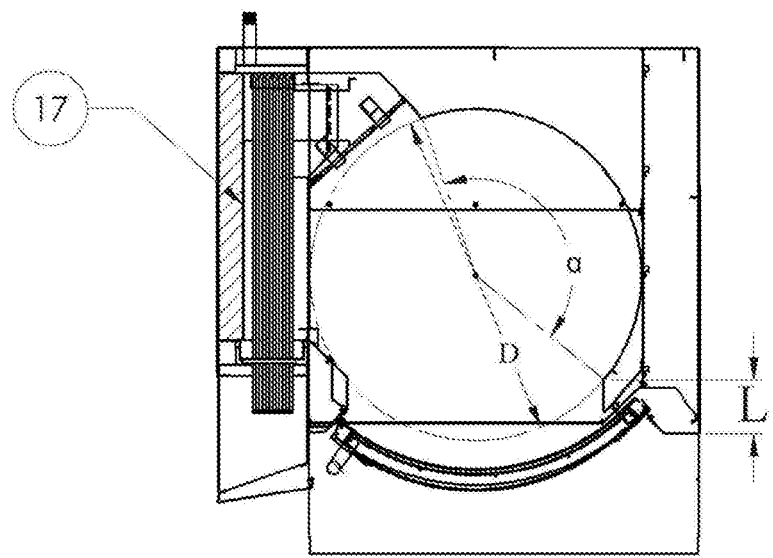
FIG. 5 shows schematically a cross-section through line V-V of the embodiment of a rack oven according to the present invention shown in FIGS. 1 and 2.

In the following description features which are well-known in the art such as hot air supply and exhaust systems are not described in detail except where necessary to aid comprehension of the invention. FIG. 1 shows schematically a perspective view of a rack convection oven 1, FIG. 2 shows a front view of the oven of FIG. 1, FIG. 3 shows a section through line III-III in FIGS. 1 and 2, and FIGS. 4 and 5 respectively show sections through lines IV-IV, resp. V-V in FIGS. 1 and 2. Hot air rack oven 1 has an external housing 3 which encloses an oven chamber 5, a hot air inlet 7 in the form of a vertical series of horizontal openings 8 in the wall of the oven chamber though which hot air is blown into the oven chamber, an exhaust outlet 9 via which hot air is removed from the oven chamber and a door 11. As is normal in baker's ovens, at least some of the exhausted air is conveyed by a fan 15 through suitable ducting (shown generally by 16) past a heater 17 and re-introduced into the oven chamber via hot air inlet 7. The food products are placed on pans, trays, slings or other suitable supports in a wheeled rack (not shown) which is transported into the oven chamber 5, and the shape of the openings 8 in the hot air inlet are preferably designed so that hot air will flow in a desired manner through the oven chamber. Preferably the hot air flow is arranged so that the heating of the goods being baked is even, with an even transfer of heat from the top to bottom of the rack and from the outer edge to the centre of the baking tray. This can be achieved by angling the opening upwards so that the air flows hit the baking trays at an upward angle to provide heat to the underside of the goods being baked. The products in the oven are thus heated by being directly touched by a stream of hot air as well as indirectly through the trays that they lie on. The wheeled rack is supported from the ceiling of the oven chamber by a powered rack rotating mechanism for rotating the rack 18 which rotates about a substantially vertical axis V.

Oven chamber 5 comprises a chamber wall 19 covered by a ceiling 21 and provided with a floor 23 and a front opening 25 which can be closed by a movable door 11. Unlike previous rack ovens which have oven chambers which have straight walls, and a straight or slightly convex door, such that the oven chamber has a substantially quadratic horizontal cross-section, the oven chamber of this embodiment of the present invention has a horizontal cross-section which is rounded. As can be seen from the cross-section of the rack oven in FIGS. 4 and 5, the profile of the chamber wall is substantially circular around a vertical axis at least from the height of the wheels of the rack to the full height of the rack when connected to the rack rotating mechanism, and thus substantially is partly cylindrical, although for practical reasons the cylindrical shape is modified in some positions, for example by being made straight, or locally more curved, instead of being smoothly rounded, with some projections away from the interior of the circular shape being provided to permit the mounting and connection of a hot air supply, a possible steam generation system, and other necessary items, and to provide a door opening, an optional entry port, and mounting arrangement for the convex sliding door. In the embodiment shown in FIGS. 1-5 a curved portion 27 of the oven chamber wall subtends continuously over an angle $\alpha$ which preferably is at least 80° and less than 300°, more preferably is between 90° and 270°, and most preferably is between 100° and 240°, of the total perimeter of the wall of the oven chamber and is formed by a segment of the surface of a cylinder of diameter D and height H, wherein D is greater than the diagonal distance d from diametrically opposite corners of the largest wheeled rack which is intended to be used in the oven and H is at least the height between the lowest and highest goods supporting surface of the largest rack intended to be used in the oven. Preferably the vertical central axis of curved portion 27 of the oven chamber wall is substantially coaxial with the vertical axis of rotation V of the rack rotating mechanism. Opening 25 subtends an angle which at the innermost edges of the opening preferably is between 60° and 100°, and more preferably is between 80° and 90° of a segment of diameter D. Door 11 is curved with the essentially the same diameter (slightly larger) of curvature D as the oven chamber wall is, and is able to slide laterally to one side of the opening at the outside of the oven. Opening 25 may be provided with an entry port 26 of length L. Preferably length L is between 50 mm and 200 mm and more preferably it is between 100 mm and 150 mm.

Typically wheeled racks are adapted to carry pans and trays with standard dimension of, for example, 800×600 mm. A rack for an 800 mm×600 mm tray is approximately 850×660 mm wide. The distance between diametrically opposed corners of a 850×660 mm rack is 1076 mm and In order to provide a total of 50 mm clearance for the frame of the rack and the hands of an operator holding the frame, the minimum diameter Dmin of the cylindrical chamber wall segment 27 for such a rack should preferably be at least 1126 mm. In order to minimise the floor space required for the oven, the maximum diameter Dmax of the cylindrical chamber wall segment preferably should not be more than 200 mm greater than Dmin. Thus, for a rack with a maximum horizontal diagonal distance, R, the diameter of curvature D of the curved portion of the oven chamber is preferably between R+50 mm and R+250 mm.

In order to allow a rack for 800×600 mm trays to be introduced into the oven the door opening should be at least 760 mm wide, i.e. at least 100 mm wider than the rack in order to allow 50 mm space for the hands of an operator on each side of the rack. If a smaller tray and rack is used, e.g. a 457 mm tray on a rack which, because of its frame is has an extra width of 30 mm each side of the tray, and a hand clearance of 50 mm on each side of the rack is needed, then the door opening should have a minimum width of 617 mm. To allow easy entry of the rack into the oven, the door opening width may be larger e.g. 690 mm or 700 mm for a 457 mm tray.

If smaller or larger racks than those mentioned above are to be used in an oven in accordance with the present invention then the size of the oven must be adjusted accordingly. Preferably the minimum diameter of the curved portion 27 of the oven chamber wall should be at least 50 mm greater than the diagonal distance R from diametrically opposite corners of the largest wheeled rack which is intended to be used in the oven in order to allow a safety clearance. For example, if a rack has a diagonal with a length of 845 mm then the diameter of a circle which would encompass the rack when it rotates would also have a diameter of 845 mm and the oven chamber wall should have a minimum diameter Dmin of 895 mm, i.e. a 25 mm safety margin on each side to accommodate tilted or swinging racks.

Figure 6:
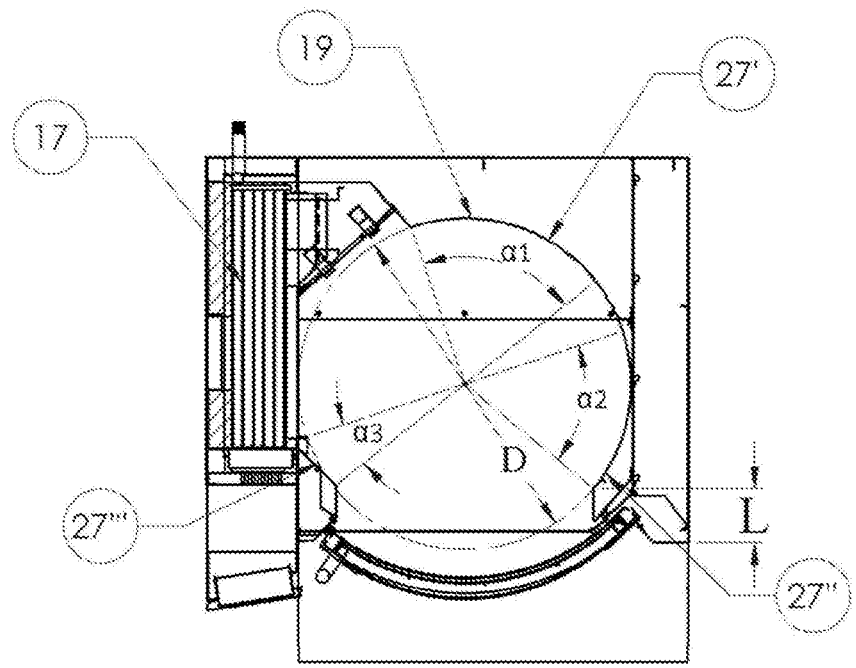
FIG. 6 shows an alternative embodiment of a cross-section corresponding to the cross-section of FIG. 5 through another embodiment of a rack oven in accordance with the present invention.

In a second embodiment of the present invention shown schematically in cross-section in FIG. 6 the oven chamber comprises a first curved wall portion 27' which preferably subtends continuously over an angle $\alpha 1$ which is at least 75° and less than 295°, more preferably is between 70° and 270°, and most preferably is between 80° and 240° of the total perimeter of the wall of the oven chamber and is formed by a segment of the surface of a cylinder of diameter D, and the oven chamber further comprises a plurality, in this example two, more additional curved wall portions 27" and 27''' each of which have preferably the same radius of curvature as, or a smaller radius of curvature than, the first curved wall portion and each of which subtend over an angle $\alpha 2$, respectively $\alpha 3$, which is more than 5° and less than 60° of the total perimeter of the wall of the oven chamber.

In a further embodiment of the present invention an oven chamber comprises a first curved wall portion which preferably subtends continuously over an angle $\alpha 1$ which is at least 75° and less than 295°, more preferably is between 80° and 275°, and most preferably is between 80° and 240° of the total perimeter of the wall of the oven chamber and is formed by a segment of the surface of a cylinder of diameter D, and the oven chamber further comprises a single additional curved wall portion which has preferably the same radius of curvature as the first curved wall portion or a smaller radius of curvature than the first curved wall portion, and which subtends over an angle $\alpha 2$, which is more than 5° and less than 60° of the total perimeter of the wall of the oven chamber.

Preferably in each embodiments of the present invention the vertical central axis of each curved portion of the oven chamber wall with a diameter of curvature D is substantially coaxial with the vertical axis of rotation V of the rack rotating mechanism. Furthermore, the curved portion or portions of the oven chamber wall need only to be arranged in the vertical extent of the oven chamber in which the hot air is directed at goods being baked—thus it is possible that at floor level and/or at ceiling level the chamber of the oven lacks a curved portion.

The invention claimed is:

1. A hot air rotating rack oven, for the baking of goods on a plurality of trays situated in a rack, the oven comprising:
   an oven chamber;
   an oven chamber wall;
   a hot air inlet in the form of a vertical series of openings in the wall of the oven chamber through which hot air is blown into the oven chamber;
   an exhaust outlet via which hot air is removed from the oven chamber;
   a door opening configured to permit said rack to be wheeled or slid into said oven chamber in at least transient contact with a portion of the door opening perimeter;
   a door; and
   a rack rotating mechanism that rotates a rack about a vertical axis, the rack configured to hold a plurality of trays;
   wherein the oven chamber wall has one or more curved portions, each of which is a segment of a circle of diameter D and perimeter P with respect to the vertical axis, such that the oven chamber wall is substantially coaxial with the vertical axis of rotation of the rack;
   wherein said one or more curved portions subtend over an angle with respect to the substantially vertical axis and that the total angle subtended by all of said one or more curved portions collectively is more than 80° and less than 300° of the perimeter P of the chamber, and
   wherein said door is curved with essentially the same diameter D as the oven chamber, and is able to slide, along a path defined by the perimeter P of the chamber, to one side of the opening, said opening subtending an angle which at the innermost edges of the opening is between 60° and 100°.

2. A hot air rotating rack oven according to claim 1, wherein the oven chamber wall comprises a single curved portion which subtends continuously for an angle which is more than 80° and less than 300° of the perimeter of the chamber.

3. A hot air rotating rack oven in accordance with claim 2, wherein the curved portion subtends continuously over an angle which is between 90° and 270° of the perimeter of the chamber.

4. A hot air rotating rack oven in accordance with claim 3, characterised in that the substantially vertical axis of each curved portion of the oven chamber wall is substantially coaxial with the vertical axis of rotation of the rack rotating mechanism.

5. A hot air rotating rack oven in accordance with claim 3 characterised in that the minimum diameter Dmin of a cylindrical chamber wall segment is at least 1126 mm.

6. A hot air rotating rack oven in accordance with claim 3 characterised in that the maximum diameter Dmax of a cylindrical chamber wall segment is less than 1326 mm.

7. A hot air rotating rack oven in accordance with claim 6 characterised in that the minimum diameter Dmin of a cylindrical chamber wall segment is at least 895 mm.

8. A hot air rotating rack oven in accordance with claim 3 characterised in that the minimum diameter Dmin of a cylindrical chamber wall segment is at least 895 mm.

9. A hot air rotating rack oven in accordance with claim 2, characterised in that the substantially vertical axis of each curved portion of the oven chamber wall is substantially coaxial with the vertical axis of rotation of the rack rotating mechanism.

10. A hot air rotating rack oven in accordance with claim 2, characterised in that the minimum diameter Dmin of a cylindrical chamber wall segment is at least 1126 mm.

11. A hot air rotating rack oven in accordance with claim 2 characterised in that the maximum diameter Dmax of a cylindrical chamber wall segment is less than 1326 mm.

12. A hot air rotating rack oven in accordance with claim 11 characterised in that the minimum diameter Dmin of a cylindrical chamber wall segment is at least 895 mm.

13. A hot air rotating rack oven in accordance with claim 2 characterised in that the minimum diameter Dmin of a cylindrical chamber wall segment is at least 895 mm.

14. A hot air rotating rack oven in accordance with claim 1, wherein the oven chamber wall has two or more curved portions, at least one of which subtends over an angle which is less than 60° but greater than 5° of the perimeter of the chamber.

15. A hot air rotating rack oven in accordance with claim 1, characterised in that the substantially vertical axis of each curved portion of the oven chamber wall is substantially coaxial with the vertical axis of rotation of the rack rotating mechanism.

16. A hot air rotating rack oven in accordance with claim 1 characterised in that the minimum diameter Dmin of a cylindrical chamber wall segment is at least 1126 mm.

17. A hot air rotating rack oven in accordance with claim 1 characterised in that the maximum diameter Dmax of a cylindrical chamber wall segment is less than 1326 mm.

18. A hot air rotating rack oven in accordance with claim 1 characterised in that the minimum diameter Dmin of a cylindrical chamber wall segment is at least 895 mm.

19. A hot air rotating rack oven in accordance with claim 18 characterised in that the maximum diameter Dmax of a cylindrical chamber wall segment is not more than 200 mm greater than Dmin.

* * * * *